United States Patent [19]
Dick

[11] 4,083,238
[45] Apr. 11, 1978

[54] SYSTEM FOR TESTING PROXIMITY FUZES
[75] Inventor: John O. Dick, Ventura, Calif.
[73] Assignee: The United States of America as repesented by the Secretary of the Navy, Washington, D.C.
[21] Appl. No.: 724,128
[22] Filed: Sep. 17, 1976
[51] Int. Cl.² .................................................. G01S 7/40
[52] U.S. Cl. .................................. 73/167; 343/17.7; 343/18 E
[58] Field of Search ................... 73/167, 432 SD; 343/17.7

[56] References Cited

U.S. PATENT DOCUMENTS

| 2,977,590 | 3/1961 | Lovick | 343/17.7 |
|---|---|---|---|
| 3,015,820 | 1/1962 | Plotkin | 343/17.7 |
| 3,130,405 | 4/1964 | Kelly, Jr. | 343/17.7 |
| 3,161,878 | 12/1964 | Quinlivan | 343/17.7 |
| 3,277,476 | 10/1966 | Sabin et al. | 343/17.7 |
| 3,794,999 | 2/1974 | Gellekink | 343/17.7 |
| 3,986,394 | 10/1976 | Greenlees | 73/167 |

Primary Examiner—Richard C. Queisser
Assistant Examiner—John S. Appleman
Attorney, Agent, or Firm—Richard S. Sciascia; Joseph M. St.Amand; William W. Cochran

[57] ABSTRACT

A system for testing the performance and vulnerability of proximity fuzes under simulated live hardware conditions. The performance of the system is evaluated by the application of a repeater jammer signal within the cutoff range of the proximity fuze which is mounted in a free space test site. Beyond the cutoff range, the vulnerability of the proximity fuze is tested by the application of an unlimited number of modulated interference jamming signals which simulate approach and intercept of interference jamming sources.

9 Claims, 3 Drawing Figures 4,083,238

SYSTEM FOR TESTING PROXIMITY FUZES

BACKGROUND OF THE INVENTION

The present invention pertains generally to measuring and testing systems and more particularly to measuring and testing fuzing systems used in the presence of countermeasure jamming radar. The conventional method of testing live hardware proximity fuzes has been to perform actual firing tests with live missiles or flyover operations which allow the operation of the proximity fuze to be evaluated under simulated live conditions. Actual firing operations can be quite expensive, typically in the range of hundreds of thousands of dollars to millions of dollars for each live test. Also, since the environment in an actual testing situation cannot be controlled with high precision, the probability of a good intercept is not high. Furthermore, near misses or misses at specified distances cannot be performed readily nor repeated to actually evaluate the performance of the fuze system.

Although flyover testing provides a more closely controlled environment, various other problems such as ground scatter and false signal sources, subject the flyover tests to question.

SUMMARY OF THE INVENTION

The present invention overcomes the disadvantages and limitations of the prior art by providing an improved system for testing the performance of a proximity fuze. The present invention comprises a free space test site in which various jamming signals are applied to a live hardware proximity fuze to evaluate its performance and test its vulnerability to interference jamming signals under simulated live conditions.

It is therefore an object of the present invention to provide an improved system for testing the performance of live hardware proximity fuzes.

It is also an object of the present invention to provide an improved system for testing the vulnerability of proximity fuzes to interference jamming signals.

Another object of the present invention is to provide an improved system for evaluating proximity fuze performance in the presence of multiple jamming signals.

Another object of the present invention is to provide a controlled environment for testing proximity fuzes.

Another object of the present invention is to provide an inexpensive system for the repeated testing of proximity fuzes to confirm data.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing abstract of the disclosure is for the purpose of providing a non-legal brief statement to serve as a searching and scanning tool for scientists, engineers and researchers, and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
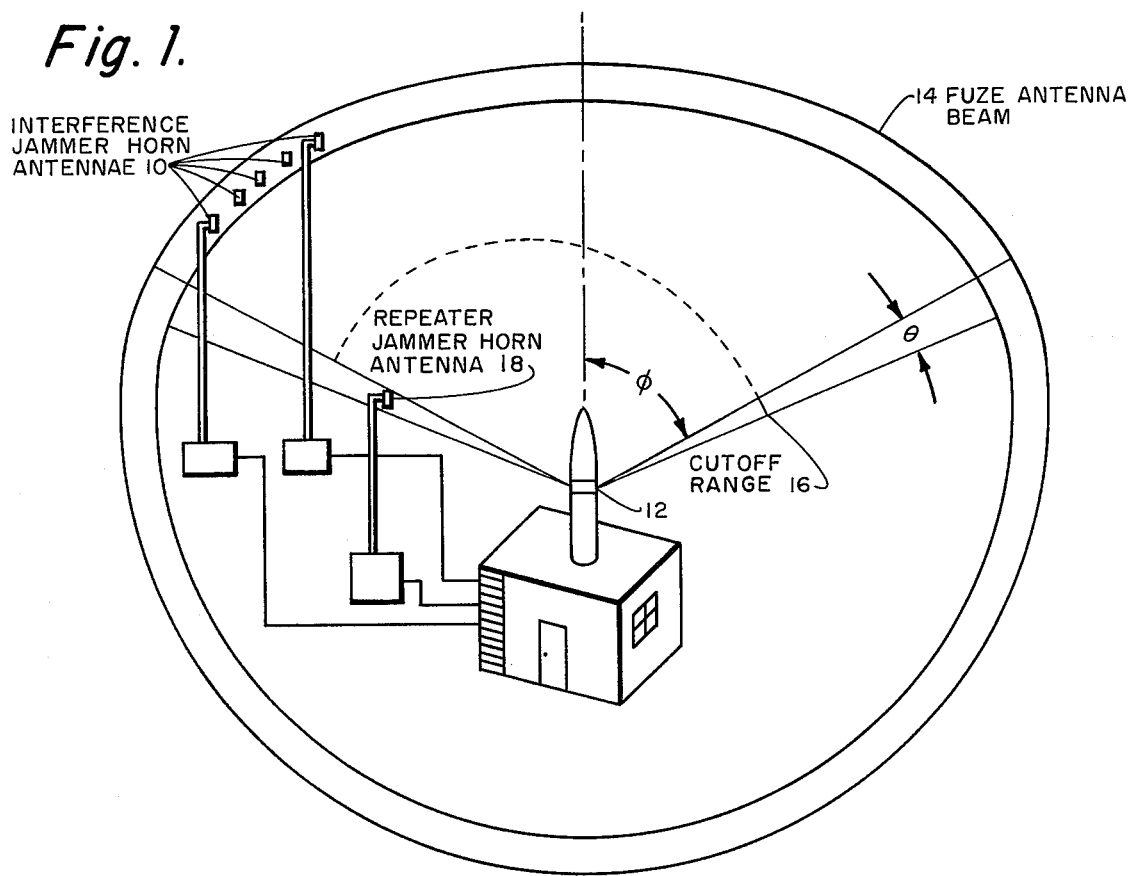
FIG. 1 is a perspective view of a schematic illustration of the free space test site of the present invention.

FIG. 1 illustrates the layout of the free space test site of the preferred embodiment of the invention. The free space test site permits testing of the live fuze systems under controlled environmental conditions for particular engagement simulation. The test site allows individual interference signals from horn antennae 10 to be radiated directly into the antenna fuze system of proximity fuze 12. The horn antennae 10 are mounted within the fuze antenna beam 14, which forms a narrow cone in space. The horn antennae 10 are mounted beyond the cutoff range 16 which is the potential lethal range of the missile at intercept. A repeater jammer horn antenna 18 is also mounted within the antenna fuze beam 14 but within the cutoff range 16 of the fuze. Antenna 18 broadcasts the target backscatter signal to test the fuze 12 to determine if it is functioning properly.

Figure 2:
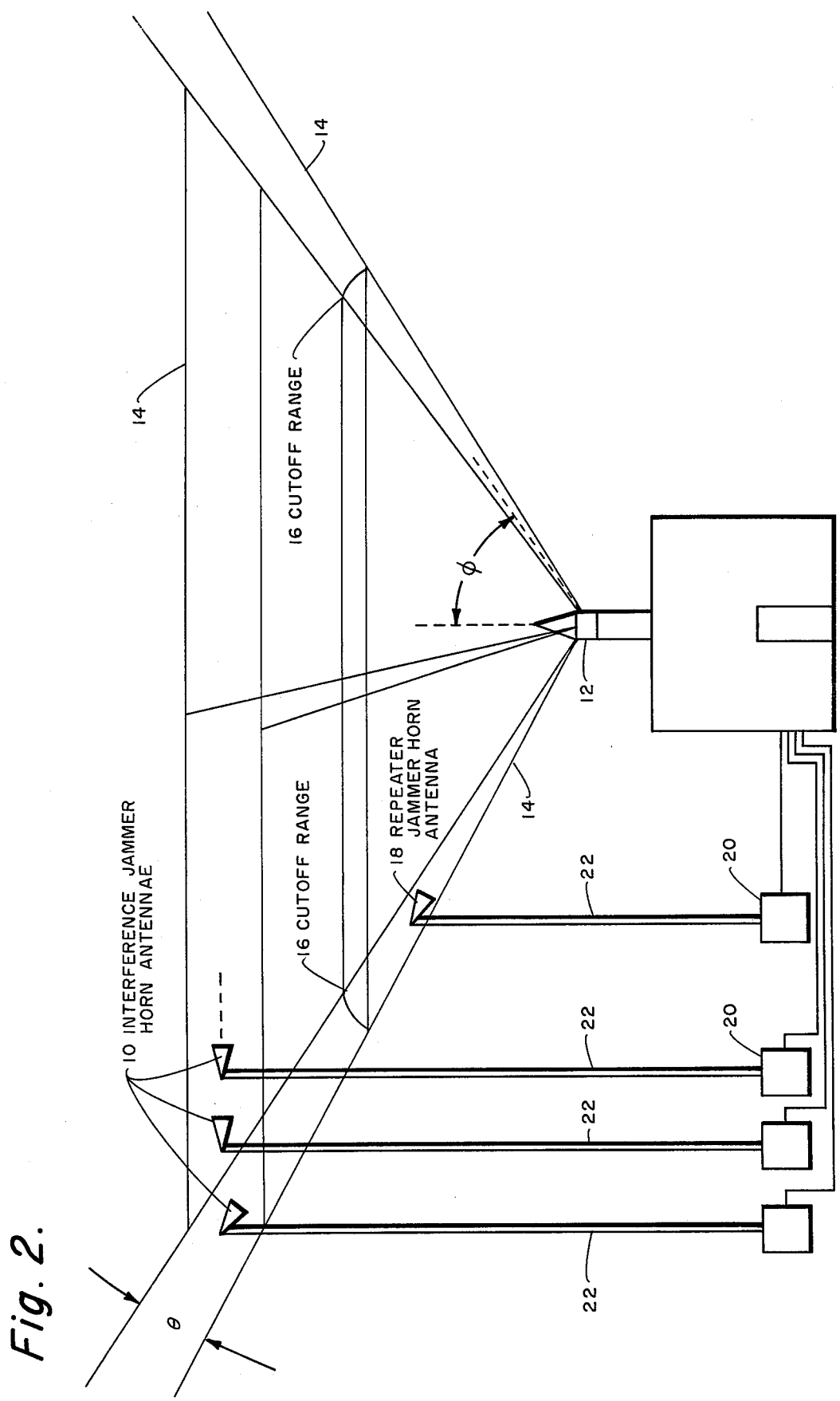
FIG. 2 is a side view of the free space test site.

FIG. 2 is a side view of the free space test site as shown in FIG. 1. As shown in FIG. 2, repeater jammer horn antenna 18 and interference jammer horn antennae 10 are mounted in the fuze antenna beam 14 which forms a hollow cone in space having an angular offset $\phi$ from the vertical and an angular width $\theta$ of the beam 14 by means of support poles 22 which are in turn mounted on stands 20. Any practical manner of mounting these antennae is sufficient as long as the interference jammer horn antennae 10 are beyond the cutoff range 16 while repeater jammer horn antenna 18 is within the cutoff range. By mounting the fuze 12 in the manner shown, backscatter from ground interference which might cause erroneous input signals is eliminated.

Figure 3:
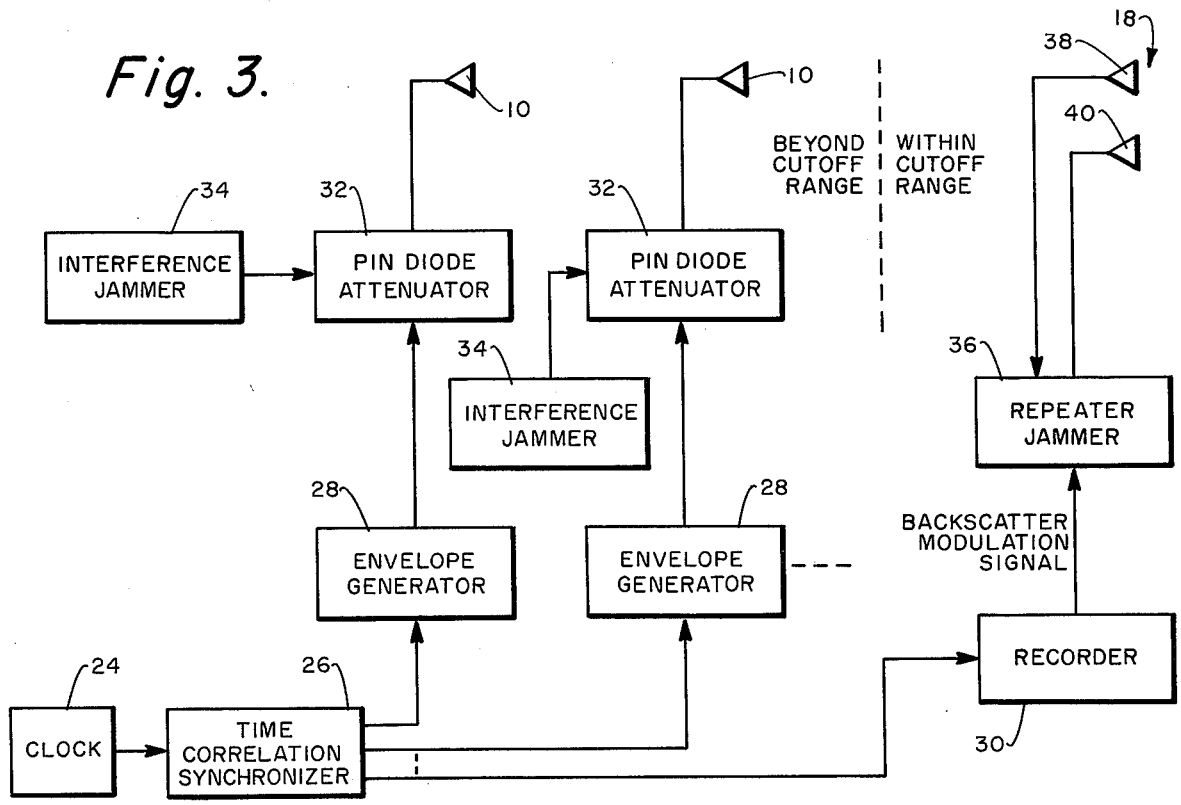
FIG. 3 is a block diagram of the jammer control circuitry of the preferred embodiment of the invention.

FIG. 3 is a block diagram of the control circuitry of the preferred embodiment of the invention. As shown therein, the clock 24 applies clock pulses to a time correlation synchronizer 26 which in turn produces control pulses to selectively activate envelope generators 28 and recorder 30. When activated, envelope generators 28 produce output signals representative of the magnitude of typical interference jamming signals through approach and intercept with a target. Each incremental signal of each envelope generator represents the instantaneous value of the interference jamming signal so that when the incremental signals are taken together, they outline the envelope of the individual jamming signal at power levels seen by the fuze antenna. In a similar manner, the envelope signals could be generated from any source capable of reading out a desired envelope signal within a desired time frame, such as from various memory banks or tape readout systems.

These signals forming the envelope are applied to pin diode attenuators 32 which function to attenuate the output signal of interference jammers 34 to radiate the same amplitude level signal at the output of horn antennae 10 as the fuze would see at an actual intercept situation. Different U-wave energy envelopes produced at antenna horns 10 can be produced by various envelope generators 28 and can be synchronized for activation at various times for testing the fuze against various encounter situations. The antenna horns 10 are located beyond the cutoff range of the proximity fuze so that jamming signals simulating an intercept can be applied to the fuze to determine if the fuze will activate in response to signals produced beyond its cutoff range. Of course, the location and distance of the horn antennae 10 from the proximity fuze 12 can be varied to evaluate fuze operation at various miss distances and locations.

The recorder 30, when activated, reproduces a target backscatter modulation signal which is applied to the repeater jammer 36. The target backscatter signal is a digitally recorded signal of the target plane backscatter obtained from a live flyover test. In operation, the receiver horn antenna 38 of repeater jammer horn antennae 18 receives the transmitted radar signal from the fuze and applies it to repeater jammer circuitry 36. The repeater jammer 36 retransmits the fuze signal and the pin diode attenuator shapes the envelope of the target signal in accordance with the backscatter modulation signal produced by the recorder 30. The repeated signal is subsequently broadcast through horn antenna 40 located within the fuze antenna beam 14. This backscatter signal which is applied to the proximity fuze 12 tests the reaction of the fuze to various target backscatter signals within the cutoff range of the fuze. In this manner, proper operation of the fuze in response to particular backscatter signals can be determined.

The interference jamming signals broadcast from beyond the cutoff range to the proximity fuze therefore determines vulnerability of the fuze to activation from signals beyond its cutoff range while the repeater jammer signals test the performance of the fuze in the presence of valid backscatter signals broadcast from within the cutoff range of the proximity fuze, thereby providing a full range evaluation of the fuze system.

By placing the antenna horns at various locations with respect to the fuze antenna and introducing various jamming signals, the test site also provides a controlled environment for testing the complete fuze system, thereby simulating a real life intercept situation which has not previously been possible.

Of course, conditions simulating fuze operation throughout flight and intercept in the presence of a combination of various jamming signals can be produced in the laboratory by applying computer models of various jamming signals to a computer model of the fuze system to determine stress areas of fuze operation. However, these computer tests must be confirmed by complete laboratory bench system tests before testing in the free space test site which comprises realistically combining or mixing all of the jamming signals produced by the free space test system in the fuze mixer electronics without the fuze antenna to evaluate fuze performance and confirm stress areas.

The system of the preferred embodiment therefore provides an improved means for reliably testing proximity fuzes in a controlled environment which closely simulates live conditions. In this manner, stress areas of fuze operation can be determined to allow for redesign of the fuze system to meet specific problems in the live fuze hardware.

Obviously many modifications and variations of the present invention are possible in light of the above teachings. It is therefore to be understood that within the scope of the appended claims the invention may be practiced otherwise than as specifically described.

What is claimed is:

1. An improved system for testing the performance of a proximity fuze having a predetermined cutoff range in response to an interference jamming signal comprising:
   a. means for generating an interference jamming signal;
   b. means for generating a predetermined envelope signal;
   c. means for attenuating said interference jamming signal in response to said envelope signal to simulate approach and intercept of said proximity fuze with an interference jamming source;
   d. means for mounting said proximity fuze at a test site of said system such that an antenna beam pattern of said proximity fuze forms a narrow cone in free space at said test site;
   e. horn attenna means mounted beyond said predetermined cutoff range for radiating said interference jamming signal in said narrow cone antenna beam pattern to test false activation of said proximity fuze in response to interference jamming signals.

2. The system of claim 1 further comprising time correlation synchronizer means for activating said means for generating said interference jamming signal to produce a series of delayed interference jamming signals.

3. An improved system for testing the performance of a proximity fuze having a predetermined lethal range in response to an interference jamming signal comprising:
   a. means for generating an interference jamming signal;
   b. means for generating various backscatter signals which simulate approach and intercept of said proximity fuze to a target backscatter source;
   c. means for generating a predetermined envelope signal;
   d. means for attenuating said interference jamming signal in response to said envelope signal to simulate approach and intercept of said proximity fuze with an interference jamming source;
   e. means for mounting said proximity fuze at a test site of said system such that an antenna beam pattern of said proximity fuze forms a narrow cone in free space at said test site;
   f. first horn antenna means mounted beyond said predetermined lethal range for radiating said interference jamming signal in said narrow cone antenna beam pattern to test false activation of said proximity fuze in response to interference jamming signals; and
   g. second horn antenna means mounted within said predetermined lethal range for radiating said backscatter signals within said narrow cone antenna beam pattern to test false activation of said proximity fuze in response to said various backscatter signals.

4. The system of claim 3 further comprising time correlation synchronizer means for activating said means for generating said interference jamming signal to produce a series of delayed interference jamming signals.

5. An improved system for testing the response of a proximity fuze to various target signature backscatter signals comprising:
   a. means for generating various target signature backscatter signals which simulate approach and intercept of said proximity fuze with a backscatter source;
   b. means for mounting said proximity fuze at a test site so that an antenna beam of said proximity fuze forms a narrow cone in free space at said test site;
   c. means for radiating said target signature backscatter signals from a location in said narrow cone antenna beam pattern within a predetermined cutoff range of said proximity fuze to determine which target signature backscatter signals activate said proximity fuze.

6. An improved system for testing the vulnerability of a proximity fuze to various interference jamming signals comprising:
   a. means for generating various interference jamming signals which vary in magnitude to simulate approach and intercept of said proximity fuze with an interference source;
   b. means for mounting said proximity fuze at a test site so that an antenna beam of said proximity fuze forms a narrow cone in free space at said test site;
   c. means for radiating said interference jamming signals from a location in said narrow cone antenna beam pattern beyond a predetermined cutoff range of said proximity fuze to determine if said proximity fuze will activate in response to determine if said various interference jamming signals which are radiated from a location beyond said predetermined cutoff range of said proximity fuze.

7. The system of claim 6 wherein said means for generating various interference jamming signals comprises:
   a. means for generating an attenuation signal which varies in magnitude according to a predetermined envelope representative of an approach and intercept of an interference jamming source;
   b. means for producing an interference jamming signal;
   c. means for attenuating said interference jamming signal in response to said attenuation signal.

8. An improved system for testing the response of a proximity fuze to various backscatter signals and interference jamming signals comprising:
   a. means for generating various backscatter and interference jamming signals which vary in magnitude to simulate approach and intercept of said proximity fuze with a backscatter and interference source;
   b. means for mounting said proximity fuze at a test site so that an antenna beam of said proximity fuze forms a narrow cone in free space at said test site;
   c. means for radiating said backscatter signals from a location in said narrow cone antenna beam pattern within a predetermined cutoff range of said proximity fuze and said interference jamming signals from a location in said antenna beam pattern beyond a predetermined cutoff range to test false activation of said proximity fuze.

9. The system of claim 8 wherein said means for generating various interference jamming signals comprises:
   a. means for generating an attenuation signal which varies in magnitude according to a predetermined envelope representative of an approach and intercept of an interference jamming source;
   b. means for producing an interference jamming signal;
   c. means for attenuating said interference jamming signal in response to said attenuation signal.

* * * * *